United States Patent
Cheng

(10) Patent No.: US 8,029,590 B2
(45) Date of Patent: Oct. 4, 2011

(54) COLLAPSIBLE FILTRATION TANK FOR A DUST COLLECTOR

(75) Inventor: Yuan-Tai Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 548 days.

(21) Appl. No.: 12/323,549

(22) Filed: Nov. 26, 2008

(65) Prior Publication Data

US 2010/0126126 A1 May 27, 2010

(51) Int. Cl.
*B01D 50/00* (2006.01)

(52) U.S. Cl. .............. 55/498; 55/493; 55/378; 55/429; 55/428; 55/356; 55/304; 55/305; 55/472; 55/DIG. 3; 95/273; 15/347

(58) Field of Classification Search .............. 55/498, 55/493, 378, 429, 428, 356, 304, 305, 472, 55/DIG. 3; 95/273; 15/347
See application file for complete search history.

(56) References Cited

U.S. PATENT DOCUMENTS

| | | | | |
|---|---|---|---|---|
| 3,120,432 A * | 2/1964 | Aldrich | | 55/315 |
| 4,993,107 A * | 2/1991 | Zoni | | 15/352 |
| 5,961,696 A * | 10/1999 | Gombos | | 95/273 |
| 6,507,974 B1 * | 1/2003 | Cheng | | 15/347 |
| 6,833,016 B2 * | 12/2004 | Witter | | 55/337 |
| 6,902,594 B2 * | 6/2005 | Cho | | 55/373 |
| 7,282,074 B1 * | 10/2007 | Witter | | 55/300 |
| 7,399,218 B2 * | 7/2008 | Witter | | 451/353 |
| 7,550,021 B2 * | 6/2009 | Witter | | 55/295 |
| D596,816 S * | 7/2009 | Leasure et al. | | D32/21 |
| 7,695,537 B2 * | 4/2010 | Cheng | | 55/467 |
| 7,695,538 B2 * | 4/2010 | Cheng | | 55/467 |
| 7,874,039 B2 * | 1/2011 | Lin | | 15/320 |
| 2005/0246856 A1 * | 11/2005 | Cheng | | 15/347 |
| 2005/0257507 A1 * | 11/2005 | Tsai | | 55/428 |
| 2008/0016830 A1 * | 1/2008 | Witter | | 55/337 |
| 2009/0106931 A1 * | 4/2009 | Lin | | 15/347 |
| 2009/0158549 A1 * | 6/2009 | Lin | | 15/347 |

FOREIGN PATENT DOCUMENTS

EP 625330 A1 * 11/1994
FR 2633507 A1 * 1/1990

* cited by examiner

*Primary Examiner* — Jason M Greene
*Assistant Examiner* — Dung H Bui
(74) *Attorney, Agent, or Firm* — Ming Chow; Sinorica, LLC

(57) ABSTRACT

A collapsible filtration tank for a dust collector includes an outer frame, an engaging base and a filter. The outer frame is formed cylindrical, having plural meshes formed in its circumferential wall. The engaging base is formed annular, installed around the opening of the outer frame. The filter is inserted in a chamber of the outer frame and restrictively blocked by the blocking edge of the engaging base. Thus, the filter can be independently replaced with a new one instead of shifting the whole filtration tank.

3 Claims, 4 Drawing Sheets

COLLAPSIBLE FILTRATION TANK FOR A DUST COLLECTOR

BACKGROUND OF THE INVENTION

1. Field of the Invention

This invention relates to a collapsible filtration tank for a dust collector.

2. Description of the Prior Art

As disclosed in Taiwan Patent No. 587481 shown in FIG. 1, a conventional dust collection tank 1 includes an outer frame 2, a filtration tank 3 integrally made of filtration paper and installed inside the outer frame 2, a bottom base 4 fixed at the bottom of the outer frame 2, and a cleaning device 5 fixed in an upper portion of the filtration tank 3 for swiftly and easily cleaning up the dust.

However, the filtration tank 3 is to gradually lower its filtration efficiency during its service life, it has to be periodically replaced with a new. While the integral structure of the outer frame 2 and the filtration tank 3 can achieve a great air-tight effect, the outer frame 2 must be discarded together with the filtration tank 3, stepping up cost of usage.

SUMMARY OF THE INVENTION

The object of this invention is to offer a collapsible filtration tank for a dust collector.

The main characteristics of the invention are an outer frame, an engaging base and a filter. The outer frame is formed cylindrical, provided with plural meshes formed in its circumferential wall, a chamber surrounded by the circumferential wall, an opening formed at the bottom of the chamber, and a combining flange formed around the opening. The engaging base is formed annular, installed around the opening of the outer frame, and possessing an annular blocking edge radially and horizontally extended inwards from its intermediate inner wall for being fixed with the combining flange. The filter is inserted in the chamber of the outer frame and restrictively blocked by the blocking edge of the engaging base.

Thus, the filter can be independently replaced with a new one instead of shifting the whole filtration tank, saving cost of usage. Moreover, with the outer frame not needed to be discarded, it can also prevent wasting the equipment.

BRIEF DESCRIPTION OF DRAWINGS

This invention is better understood by referring to the accompanying drawings, wherein.

DETAILED DESCRIPTION OF THE PREFERRED EMBODIMENT

Figure 1:
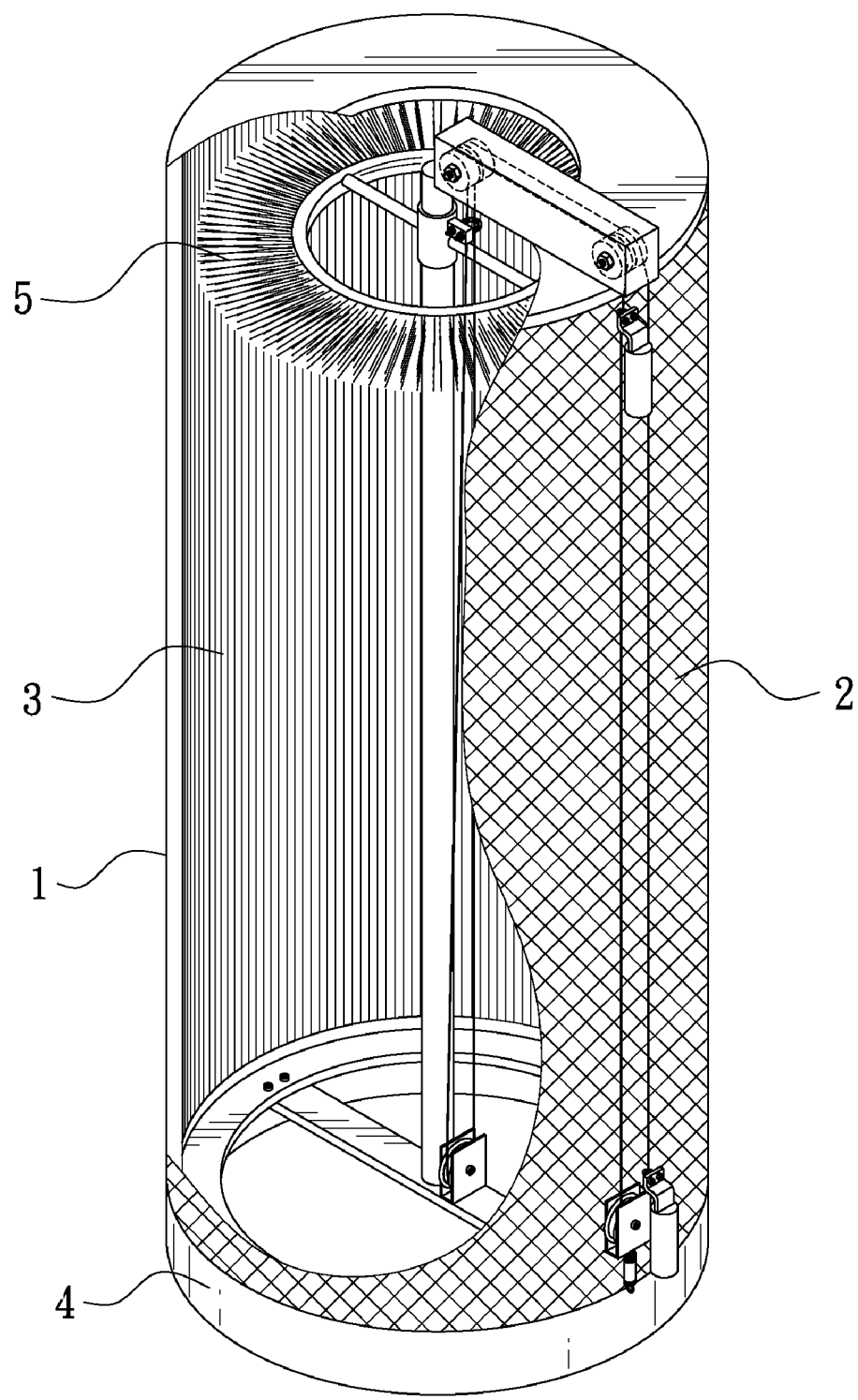
FIG. 1 is a perspective view of a conventional filtration tank.
Figure 2:
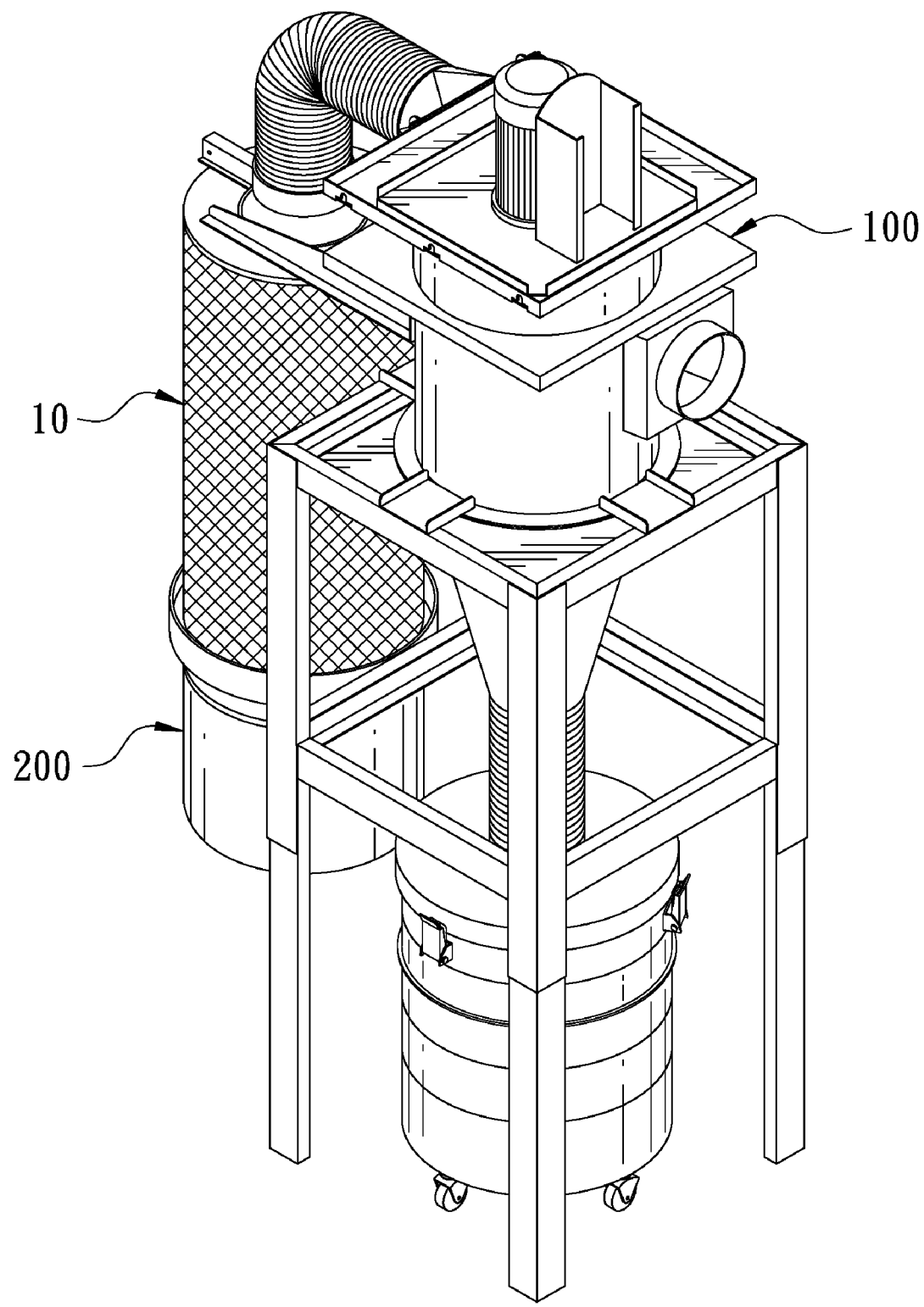
FIG. 2 is a perspective view of a preferred embodiment of a filtration tank for a dust collector in the present invention, showing it being assembled with the dust collector.

FIG. 2 shows a preferred embodiment of a collapsible filtration tank 10 for a dust collector 100 in the present invention, with the filtration tank 10 installed at one side of the dust collector 100. A dust collection bag 200 is fixed under the filtration tank 10 for collecting dust vacuumed by the dust collector 100 and dropping down from the filtration tank 10.

Figure 3:
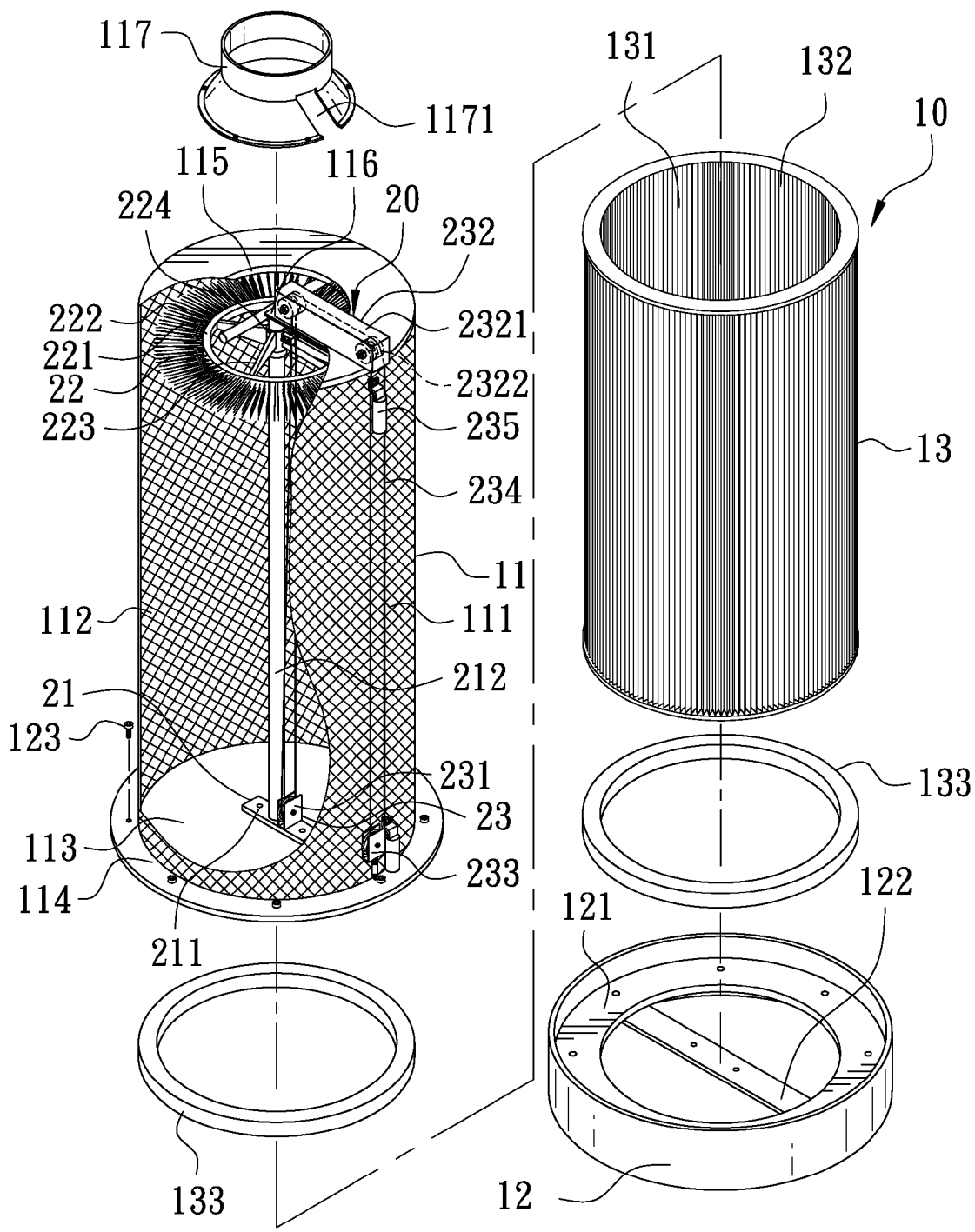
FIG. 3 is an exploded perspective view of the preferred embodiment of a filtration tank for a dust collector in the present invention, with an outer frame omitted.
Figure 4:
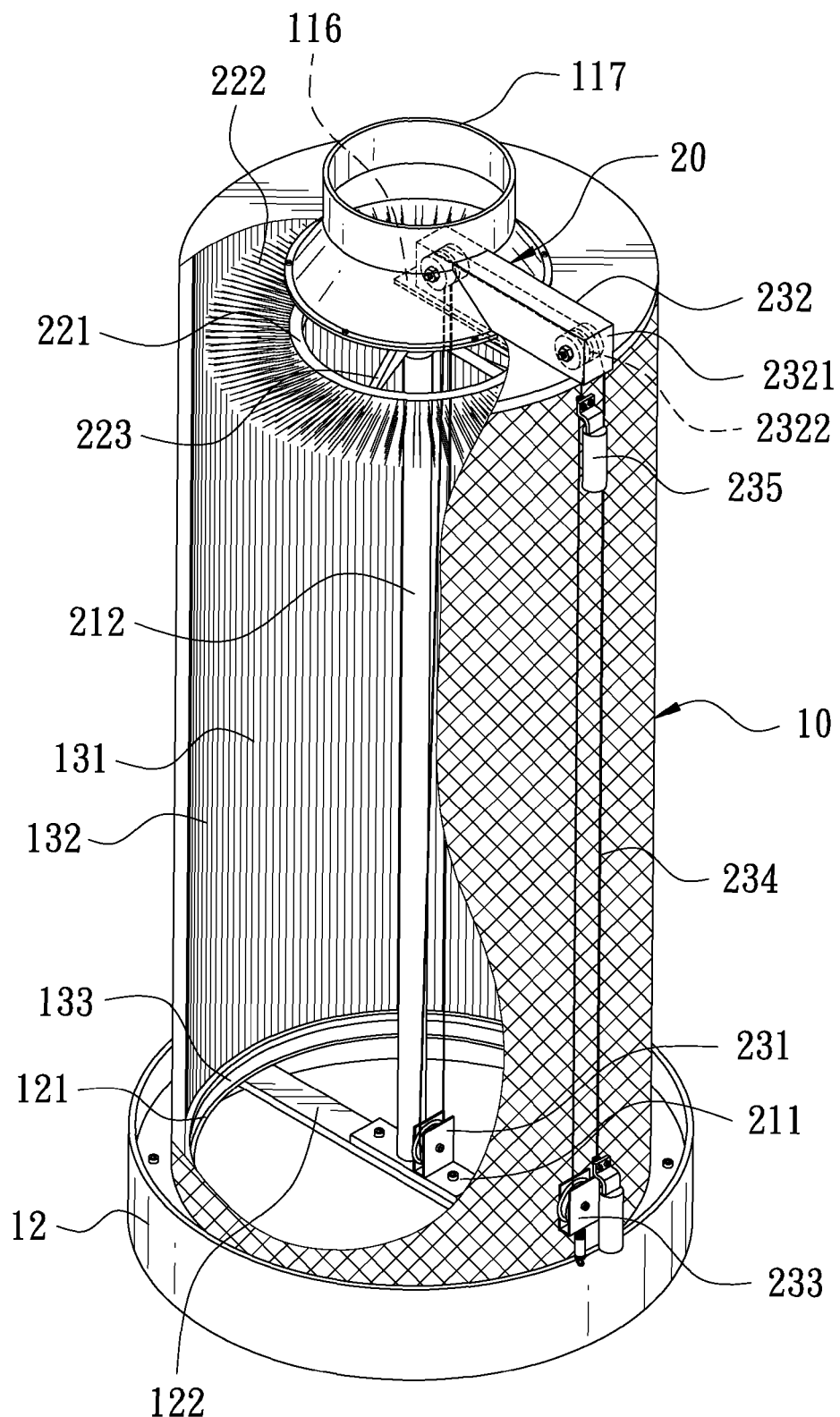
FIG. 4 is a perspective view of the preferred embodiment of a filtration tank for a dust collector in the present invention, with the outer frame omitted.

As shown in FIGS. 3 and 4, the collapsible filtration tank 10 includes an outer frame 11, an engaging base 12, a filter 13 and a cleaning device 20.

The outer frame 11 is formed cylindrical, provided with a plurality of meshes 111 formed in its circumferential wall, a chamber 112 surrounded by the circumferential wall, an opening 113 formed at the bottom of the chamber 112, and a combining flange 114 radially formed around the opening 113. Centrally bored in the top surface of the outer frame 11 is a through hole 115. A connecting board 116 is horizontally extended from the top wall of the outer frame 11 inward the through hole 115. And, the outer frame 11 is also provided with a connecting neck 117, which is to be installed above the through hole 115, having an upward opening and a restricting groove 1171 formed at its outer wall near one side of the through hole 115.

The engaging base 12 is formed annular, fitting around the opening 113 of the chamber 112, and provided with an annular blocking edge 121 radially and horizontally extended inwards from the intermediate portion of its inner wall, a positioning bar 122 diametrically fixed across the blocking edge 121, and a plurality of bolts 123 used to fix the engaging edge 114 with the blocking edge 121.

The filter 13 is integrally made of paper, formed cylindrical, inserted in the chamber 112 of the outer frame 11 and restrictively blocked by the blocking edge 121. The filter 13 is provided with a chamber 131 surrounded by its annular wall that is corrugated like saw teeth, and plural conical grooves 132 formed between every two adjacent teeth of its inner wall. In addition, the filter 13 has the circumference of its two free ends respectively sealed with an annular sponge 133, which contacts with the top wall of the outer frame 11 and the blocking edge 121 so as to achieve more air-tight effect.

The cleaning device 20 is composed of a guiding supporter 21, a brush base 22 and a dragging member 23.

The guiding supporter 21 is provided with a bottom supporting rod 211 fixedly screwed together with the center of the positioning bar 122 of the engaging base 12, and a central guiding rod 212 having its one end fixed at the center of the bottom supporting rod 211 and another one fixed on the connecting board 116 of the outer frame 11.

The brush base 22 is mounted on the top of the central guiding rod 212, provided with an annular ring 221, and a plurality of brushes 222 fixed around the outer circumference of the annular ring 221 and respectively fitted in the conical grooves 132 of the filter 13. A plurality of horizontal supporting bars 223 are extended inwards from the inner wall of the annular ring 221, equidistantly spaced apart. The brush base 22 is additionally provided with a sleeve 224 mounted around the central guiding rod 212 for being connected with the supporting bars 223 and able to axially move up and down along the central guiding rod 212 to enable the brushes 222 to axially move along the conical groves 132 to scrape dust off.

The dragging member 23 consists of a lower pulley base 231, an upper pulley base 232, an outer pulley base 233, a dragging rope 234 and two grips 235. The lower pulley base 231 is fixed on the top of the bottom supporting rod 211 near the central guiding rod 212, and the upper pulley base 232 is fixed at a preset portion of the outer edge of the connecting board 116 and fitted in the restricting groove 1171 of the connecting neck 117. The upper pulley base 232 is provided with a long box 2321, and a pulley 2322 pivotally fixed at two corresponding sides of the long box 2321 respectively. The outer pulley base 233 is set at a preset position of the bottom outer wall of the outer frame 11. The dragging rope 234 has its front end connected with the brush base 22 and its rear end first dragged down to wind around the lower pulley base 231 and then pulled up to penetrate the top wall of the connecting board 116 of the outer frame 11 to wind around the pulley 2322 of the upper pulley base 232 and successively pulled down outside the outer frame 11 to wind around the outer pulley base 233. Continually, the rear end of the dragging rope 234 is reversely dragged up to orderly wind around the upper pulley base 232 and pass into the outer frame 11 to meet the front end of the dragging rope 234 for being fixed with the brush base 22. By means of the dragging rope 234, the brush base 22 can be driven to move. The grips 235 are respectively fixed at a preset upper and lower position of the dragging rope 234 exposed between the upper pulley base 232 and the outer pulley base 233 so as to be grasped to move up and down to simultaneously keep the brush base 22 moving up and down as well.

In using, as shown in FIGS. 3 and 4, when the grip 235 positioned at the top of the dragging rope 23 is drawn down, the brush base 22 can be also dragged down by the dragging rope 234 and the other grip 235 is to be synchronously pulled up to the top. And, the brush base 22 can be pulled up by the dragging rope 234 if the other grip 235 is pulled down. Thus, with the two grips 235 alternately pushed down, the brush base 22 can be moved up and down to scrape off the dust attaching on the filter 13. Provided the filter 13 is to be replaced with a new one owing to low filtration efficiency, it just needs to overturn the filtration tank 10 and disassemble the connecting neck 117 of the outer frame 11. Then, the grips 235 are positioned outside the outer frame 11 to keep the brush base 22 positioned near the bottom of the outer frame 11, so that the used filter 13 can be smoothly removed from the outer frame 11 and the new one can be easily fitted in the outer frame, steadily corresponding to brush base 22. So, replacement of the filter 13 is easily finished.

While the preferred embodiment of the invention has been described above, it will be recognized and understood that various modifications may be made therein and the appended claims are intended to cover all such modifications that may fall within the spirit and scope of the invention.

What is claimed is:

1. A collapsible filtration tank for a dust collector, said collapsible filtration tank comprising: an outer frame formed cylindrical and provided with a plurality of meshes formed in its circumferential wall; a chamber surrounded by said circumferential wall of said outer frame; an opening formed at a bottom of said chamber; a combining flange radially formed around said opening; an engaging base formed annular and installed around said opening of said outer frame and provided with an annular blocking edge radially and horizontally extended inwards from an intermediate portion of its inner wall; said annular blocking edge being fixed with said combining flange of said outer frame; a filter inserted in said chamber of said outer frame and restrictively blocked by said blocking edge of said engaging base; said engaging base is provided with a positioning bar diametrically fixed across said blocking edge; said collapsible filtration is further provided with a cleaning device that further consists of a guiding supporter; a brush base and a dragging member; said guiding supporter inserted inside said filter and provided with a bottom supporting rod fixedly screwed together with said positioning bar of said engaging base; a central guiding rod fixed with said bottom supporting rod and fixed at a preset position of said outer frame; said brush base mounted on said central guiding rod and provided with a plurality of brushes fixed around its outer circumference and fitted inside said filter; and said dragging member provided with a dragging rope connected with said brush base and wound inside and outside said outer frame.

2. The collapsible filtration tank for a dust collector as claimed in claim 1, wherein said filter is formed cylindrical and provided with two annular sponges fitted around its two free ends.

3. The collapsible filtration tank for a dust collector as claimed in claim 1, wherein said combining flange of said outer frame is fixed together with said blocking edge of said filter by means of bolts.

* * * * *